Sept. 4, 1962 L. HANEWINKEL 3,052,872

INFORMATION STORAGE DEVICE

Filed Nov. 20, 1957 3 Sheets-Sheet 1

INVENTOR,
LORENZ HANEWINKEL
By Silverman & Mullin
Att'ys

Sept. 4, 1962 L. HANEWINKEL 3,052,872

INFORMATION STORAGE DEVICE

Filed Nov. 20, 1957 3 Sheets-Sheet 2

INVENTOR,
LORENZ HANEWINKEL
By Silverman + Mullin
Attys.

Sept. 4, 1962 L. HANEWINKEL 3,052,872

INFORMATION STORAGE DEVICE

Filed Nov. 20, 1957 3 Sheets-Sheet 3

INVENTOR.
LORENZ HANEWINKEL
By Silverman + Mullin
Att'ys.

United States Patent Office 3,052,872

Patented Sept. 4, 1962

3,052,872

INFORMATION STORAGE DEVICE

Lorenz Hanewinkel, Neukirchen, Germany, assignor to Zuse KG, Neukirchen, Germany Filed Nov. 20, 1957, Ser. No. 697,593
Claims priority, application Germany Nov. 26, 1956
6 Claims. (Cl. 340—174)

The present invention relates to an improvement of the information storage device as described in my co-pending application Serial No. 693,609, filed October 31, 1957, and entitled "Information Storage Device," and assigned to the same applicant as the application herein, which concerns a special information storage device, particularly provided for rapid memory with computing devices operating under the serial principle. With such devices the actual storage is performed by means of a ferrite core matrix, whereas the calling-up of individual horizontal matrix rows is performed serially by means of a ferrite core chain.

However, with the embodiment of the co-pending application any shifting of numbers within the storage units cannot be carried out without difficulties. Said shifting, however, is of supreme significance for computing devices, because thereby multiplicating and/or dividing by two of numbers, e.g. by using numbers of binary notation, is not easy to realize.

To overcome these difficulties a modification of the shifting registers was invented. Even though substantially the same structural elements are being used, the present invention brings about an improvement by a special and new combination of these structural elements.

The same as in the device according to the co-pending application the individual cores of the storage device are called-up one after the other by means of the ferrite core chain and subsequently the called-up binary digit is recorded again.

Whereas normally the called-up binary digit is re-stored in the same core, in case of shifting of information this re-storing must be made in another core. In case of a shifting to the right, in the event that the digits as customary are called-up from the right to the lefthand side (i.e. from the lower to the higher positions) this can be achieved by simple delay. In case of shifting to the left for reading, the same column impulse line $a_i$ (FIG. 1) which is branching off from the core chain must excite a core different than the one for restoring. In order to be able to perform these actions independently from each other, the cores are preferably divided in two groups; with one core of one group and one core of the other group being alternatively coordinated and both groups comprising separate impulse lines for the horizontal matrix rows.

Figure 1:
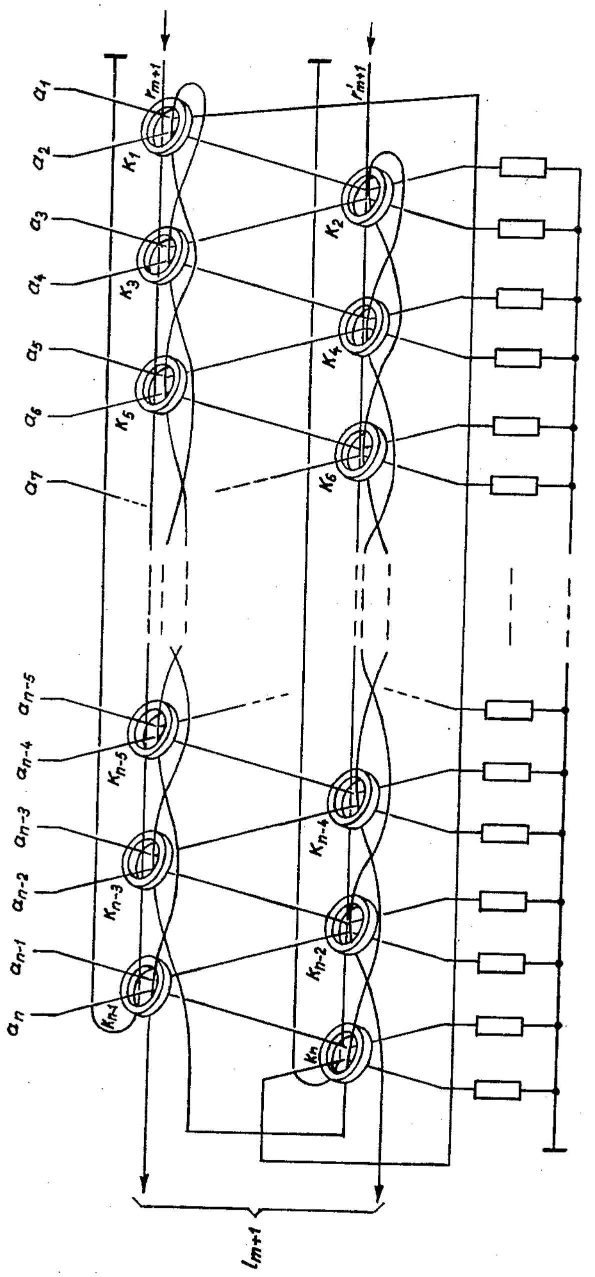
Figure 2:
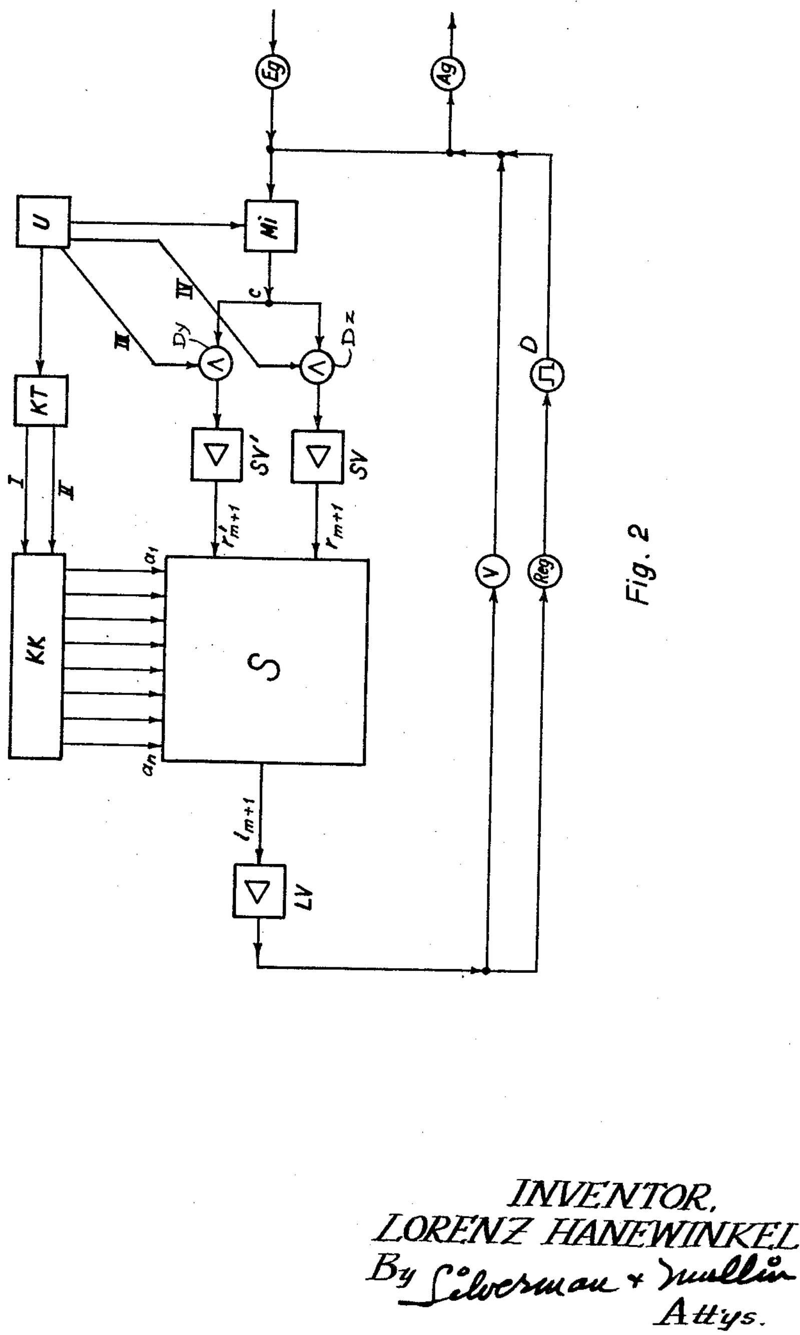
Figure 3:
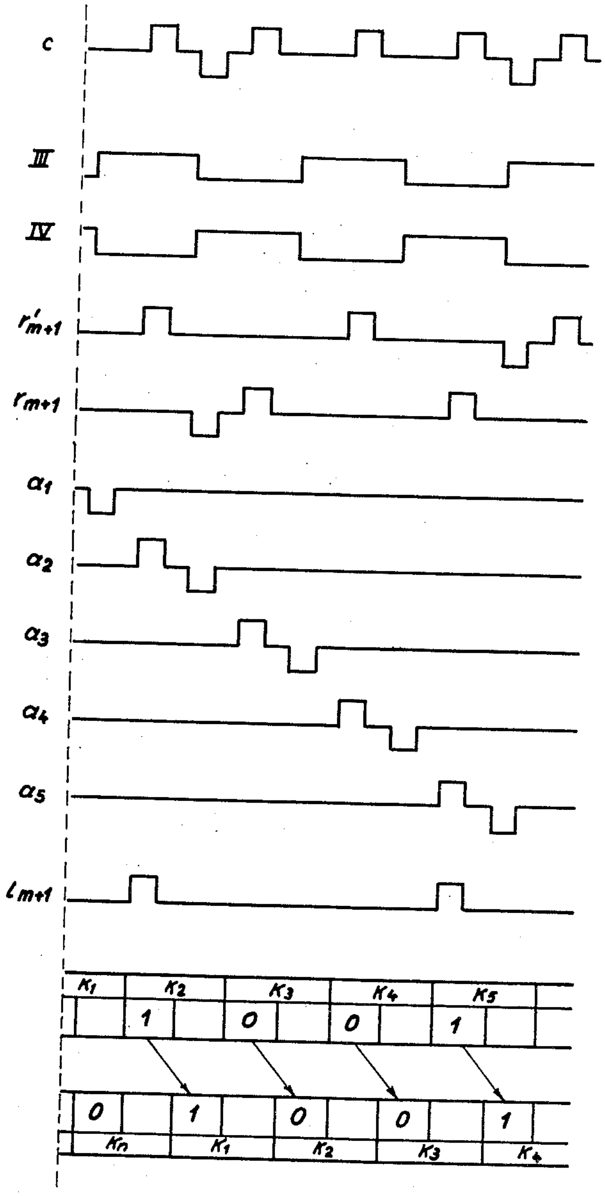

The basic principle of the present invention will in the following be described in detail with reference to the accompanying drawings, which show:

FIG. 1, the arrangement of the ferrite cores of an individual shifting register;

FIG. 2, a block diagram of the entire storage device;

FIG. 3, a time schedule.

FIG. 1 shows the arrangement of the cores and their respective lines. The cores $K_1$, $K_3$, $K_5$ . . . belong to the upper group with the joint impulse line $r_{m+1}$, whereas the cores $K_2$, $K_4$, $K_6$ do belong to the other group with the joint impulse line $r'_{m+1}$. The reading line $l_{m+1}$ may be jointly for both groups, because reading is performed only in one group at a time. The line $a_1$, $a_2$ . . . $a_n$, branching off from the ferrite core chain, are wired in such a way that, with the exception of the first line, they pass through the core of one group coordinated to the respective position and the core of the other group one position farther to the right. If one desires to regain at the lefthand side the digit which was lost during shifting to the right, the circuit may be closed by interconnection of the first and the last ferrite cores.

Briefly described, columns $a_1$–$a_n$ are pulsed successively with an alternate half-read and half-write pulse so that a simultaneously occurring half-read or half-write pulse applied to any of leads $r_{m+1}$ or $r'_{m+1}$ controls a core at the intersection accordingly. Note that the odd column leads $a_1$, $a_3$, etc. are threaded through a corresponding core $K_1$, $K_3$, etc. and then a lower ranking even numbered core $K_n$, $K_2$, etc., while the even leads $a_2$ etc. are threaded through a lower ranking odd numbered core $K_1$, etc. and then the corresponding core $K_2$, etc. Thus column leads $a_1$ and $a_2$ are both threaded through core K–1 so that a half-read pulse occurring on either lead $a_1$ or $a_2$ in conjunction with a half-read pulse on lead $r_{m+1}$ develops a read-out pulse if core K–1 has information stored therein. A following half-write pulse then occurring on the lead $a_1$ for example in conjunction with a half-write pulse on lead $r'_{m+1}$ permits that information to be stored in core $K_n$ while if a following half-write pulse is applied to lead $a_2$ and lead $r'_{m+1}$ the information can be stored in core $K_2$.

The transfer of information to, for example, a lower order core $K_1$ is accomplished by gating the output from core $K_2$ to provide a half-write pulse on lead $r_{m+1}$ which together with a simultaneously occurring half-write pulse on the lead $a_2$ causes core $K_1$ to be set to a desired magnetic condition. In a similar manner, information stored in core $K_1$ may be transferred to core $K_2$.

The scheme of FIG. 1 is destined for a one position down shifting. Any shifting to the right may be obtained by corresponding arrangement of the matrix lines $a_i$.

FIG. 2 reveals the control of the present invention. If the gate V is open, the storage works as shifting storage. If regeneration line R*eg* is open, the shifting is neutralized by the delay element D interposed in the circuit and the storage works again in the normal manner. By additional inclusion of similar controlled delay elements in the register, any shifting to the left may also be performed in known manner.

The time schedule of FIG. 3 is supposed to cover the situation when a "zero" is inserted in the storage location $K_n$ after said location is cleared by shifting. Further information in the cores $K_2$ through $K_5$ is assumed to be 1001 and will be shifted to the cores $K_1$ thorugh $K_4$. The modulated impulse *c*, originating from the mixing stage $M_1$, is passed via the clock impulses III, IV and alternatively through the amplifiers SV and SV′ to the lines $r_{m+1}$ and $r'_{m+1}$. The clock U connects for one digit period the impulse III and for another digit period the impulse IV respectively.

The alternative connection of both groups of ferrite cores makes it mandatory that with closed circuit an even number of cores is required.

In the above-mentioned co-pending application there is described an arrangement for providing a half read pulse followed by a half write pulse successively to each of series leads comprising respective column conductors. Thus the column conductor $a_1$ is pulsed by a half write pulse and thereafter the column $a_2$ is similarly pulsed. In this manner each of the succeeding column conductors $a_3$ . . . $a_n$ is provided with a half read pulse followed by a half write pulse. After the last column conductor $a_n$ is pulsed, an operating cycle is completed. Thereafter, the column conductor $a_1$ is again pulsed in a similar manner. The column conductors $a_1$ . . . $a_n$ are therefore pulsed in cyclic succession as indicated by the graphs or charts $a_1$ to $a_5$ in FIG. 3. At will be noted that only the half write pulse applied to lead $a_1$ is shown since only a portion of the complete cyclic succession of pulses is illustrated.

Assuming, therefore, that the column lead $a_2$ has been pulsed by a half read pulse, that half read pulse is applied to the cores $K_1$ and $K_2$ in rows $r_{m+1}$ and $r_{m+1}$ respectively. Simultaneously a half read pulse is applied to one of the two leads, $r'_{m+1}$ for example, as shown in FIG. 3. If core $K_2$ has previously been placed in binary state 1, indicating that it has stored information, as shown by the upper box marked $K_2$ in FIG. 3, an output pulse is generated at the lead $L_{m+1}$ as shown in FIG. 3. This output pulse is applied to the amplifier LV which in turn transmits a corresponding pulse to the two gates V and R*eg*. Either gate may be open depending upon the manner in which it is desired to operate the system. Thus, if the gate R*eg* is open, there will be an output provided to the delay circuit as indicated at D, which delays the pulse in any conventional manner for a desired period of time coincident with the arrival of a half write pulse by way of another column lead. The output from D is then applied to the mixer M*i* (FIG. 2) at a desired time. If the gate V is open, the pulse is applied to the mixer M*i* without delay. In either of these cases, a pulse derived from V or D may be used to trigger an output device at A*g*.

The mixer M*i* may comprise any conventional gate circuit and/or amplifier and is provided with timed pulses from the clock U. It may be used alternately to permit passage of a pulse either, from the clock U, the gates D or V, or from an outside source such as indicated at E*g*. The said outside source may be used for storing or writing completely new information, for example.

The mixer M*i* therefore provides half head pulses indicated by the positive waves above the base line at *c* in FIG. 3 under the influence of the clock U and the half write pulse indicated by the negative waves below the base line, in accordance with the input to M*i* from V, D or E*g*.

The clock U also provides impulses to the core driver KT for controlling the matrix KK in time periods I and II. The block indicated at KT may comprise any conventional core driver including an amplifier and gates for alternately pulsing the two leads to KK in the time periods I and II. This advances the application of half read and half write pulses to the column leads $a_1 \ldots a_n$ as described in the aforementioned co-pending application. In addition the clock U provides the pulses indicated at III and IV in FIG. 3 to the gates $D_y$ and $D_x$ to open those gates alternately in successive time periods with relation to pulses applied from the mixer M*i* shown at *c* in FIG. 3. The output of each gate $D_y$ and $D_x$ is therefore applied to the respective amplifiers SV′ and SV and from the amplifiers to the respective leads $r'_{m+1}$ and $r_{m+1}$ as shown in FIG. 3.

During the first time period indicated at III in FIG. 3, gate $D_y$ is open. The half read impulse appearing at *c* is permitted to pass to lead $r'_{m+1}$ and since a half read pulse is also occurring at lead $a_2$, as explained, core $K_2$ provides an output to LV. The output of LV is applied through gate V to M*i* and appears at *c* in FIG. 3 as the first negative going pulse. Since the clock U has closed gate $D_y$ as indicated at III in FIG. 3, and since gate $D_x$ is now open as indicated at IV in FIG. 3, a half write pulse is applied to lead $r_{m+1}$. Inasmuch as this occurs simultaneously with a half write pulse on lead $a_2$ following the half read pulse on that lead, core $K_1$ is switched to the binary state 1 as shown by the bottom box marked $K_1$ in FIG. 3.

After the mixer M*i* provides the half write pulse, it then provides a half read pulse as shown at *c* in FIG. 3. Since the clock pulse shown at IV is still effective, gate $D_x$ is open and the half read pulse appears on lead $r_{m+1}$. This occurs simultaneously with the half read pulse on lead $a_3$ and the two pulses are coincidentally applied to core $K_3$. Since core $K_3$ has no information written therein or is in the binary 0 state as shown by the upper box marked $K_3$ in FIG. 3 no useable output appears at lead $l_{m+1}$. No half write pulse is therefore provided by the mixer M*i* unless an appropriate input is desired to be provided at E*g*. Since no half write pulse is provided, coincidental with the half write pulse on lead $a_3$ no information is stored in cores $K_2$ or $K_3$. It will be noted that during the interval in which a writing pulse could have appeared at *c* that the gate $D_x$ has been closed and gate $D_y$ opened. Therefore lead $r'_{m+1}$ would have been effective had a half write pulse appeared and the state of core $K_2$ would have been changed. Since no pulse appeared, however, core $K_2$ remains in the 0 state as shown by the box marked $K_2$ at the bottom of FIG. 3.

Thereafter the mixer M*i* provides another half read pulse under control of clock U and coincident with the half read pulse on lead $a_4$. During this period clock pulse III is effective so that lead $r'_{m+1}$ is pulsed and core $K_4$ is interrogated. Since $K_4$ is in the binary state 0 as shown by the upper box marked $K_4$ in FIG. 3 no output is provided on lead $l_{m+1}$. Lead $r_{m+1}$ is rendered effective by clock pulse IV opening gate $D_x$ during the period that the half write pulse appears on lead $a_4$ but since no coincident pulse is on lead $r_{m+1}$, core $K_3$ remains in the binary 0 state as shown by the bottom box marked $K_3$ in FIG. 3.

The mixer M*i* next provides a half read pulse at *c* while gate $D_x$ is still open so that lead $r_{m+1}$ is pulsed with a half read pulse in conjunction with the half read pulse on lead $a_5$. These are both applied to core $K_5$ which is in binary state 1 as shown by the upper box $K_5$ in FIG. 3. Core $K_5$ provides an output to $l_{m+1}$ which is suitably passed by gate V to th emixer M*i* to provide the second half write pulse shown at *c*. This occurs while gate $D_x$ is rendered ineffective while gate $D_y$ and lead $r'_{m+1}$ are rendered effective to transmit the half write pulse. This half write pulse is applied coincidentally with the half write pulse on lead $a_5$ to core $K_4$ so that core $K_4$ is now set to the binary state 1 as shown by the correspondingly marked lower box in FIG. 3.

In review then it will be noted that if cores $K_1$, $K_2$, $K_3$, $K_4$ and $K_5$ bear the following binary number 01001 that number is shifted by a very simple process to 10010. Of course in the event the gate D were used a desired delay is introduced to shift the number by a desired value.

As described in my earlier filed copending application referred to above, the block KK shown in FIG. 2 includes a shift register formed of two ferrite core groups $A_1$–$A_n$ and $B_1$–$B_n$ for controlling a core matrix and it operates in the following manner: One of the cores $B_1$, for example, in group $B_1$–$B_n$ is initially set in one binary state by an input pulse applied at $i_0$. Pulses are thereafter applied alternatively to leads marked I and II connected to windings on cores $B_1$–$B_n$ and $A_1$–$A_n$ respectively. A pulse applied to lead I after core $B_1$ has been set in one binary state returns core $B_1$ to its original binary state and it provides an output pulse that sets core $A_1$ over the unidirectional circuit including diode D11 connecting the respective windings of the two cores. Core $A_1$ is thus set in one binary state and a pulse is derived therefrom that is transmitted along the column lead as $a_1$ to control the corresponding core column of the matrix for a read operation, for example. Diode D12 blocks the connection between cores $A_1$ and $B_2$ at that time.

Thereafter a pulse on lead II resets core $A_1$ to its initial binary state. An output pulse of polarity opposite to the first derived pulse from core $A_1$ is thus applied to the column lead $a_1$ for a write operation, for example. Simultaneously a pulse is provided that is transmitted over diode D12 to the core $B_2$ for setting core $B_2$.

Thereafter core $B_2$ is controlled by a pulse occurring on lead II and the process is repeated with respect to core $A_2$ and its associated column lead $a_2$. In this manner, the cores $A_1$–$A_n$ and $B_1$–$B_n$ of the ring are scanned in succession to produce output pulses along the respective column leads $a_1$–$a_n$ for either reading or writing to control the associated core matrix.

What it is desired to secure by Letters Patent of the United States is:

1. An information storage device for storage of information represented in binary notation as states of magnetization of magnetic cores, said cores being arranged in two rows, all of the cores of the first row being coupled with a first conductor, all of the cores of the second row being coupled with a second conductor, a plurality of column conductors equal in number to the number of cores, each column conductor being coupled with one core in each row, each core of one row being coupled with two column conductors and said two conductors being coupled with adjacent cores of said second row, means for generating and applying to the column conductors consecutive first impulse couples each comprising one reading impulse and one writing impulse following one another, each row having a row conductor coupling all of the cores in said row, means for generating second impulse couples synchronously with said first impulse couples, said second impulse couples each comprising one question impulse and one information impulse, means for applying said second impulse couples to said row conductors in such a manner that the writing impulse of one of said first impulse couples and the reading impulse of the next of said first impulse couples, taken together are applied alternately once into the first row conductor and once into the second row conductor.

2. A core matrix comprising a plurality of rows and a plurality of columns of magnetic binary cores with each row having an individual lead by way of which either half-write or half-read pulses are applied, a plurality of successively scanned leads each scanned by a half-read pulse followed by a half-write pulse, successive pairs of said scanned leads coupled with an individually corresponding core in a row and column and each lead of each of said pairs coupled with a core in different respective columns and in another row, and means rendered effective by one of said individually corresponding cores in the event it is one state of magnetic remanence in response to a half read pulse on one of its pair of scanned leads and a half read pulse on its row lead for generating a half write pulse on said other row lead coincident with the occurrence of a half write pulse on said one lead of said pair for switching the core in a different column and in said other row.

3. A storage matrix comprising a plurality of binary storage elements arranged in rows and columns with the storage elements in one row each assigned a different odd digital value and the elements in another row each assigned a different even digital value and with each row having an individual lead coupling the elements in its row, and a plurality of other leads each assigned a different digital value and arranged so that each other lead assigned an odd digital value and each other lead assigned the succeeding even value are coupled with a core in said one row assigned the respective odd digital value and are respectively coupled to different cores in said other row, said lead assigned the odd digital value being coupled with a core in said other row assigned the preceding even value and the lead assigned the even value coupled with the core in said other row assigned individually corresponding even value.

4. The arrangement claimed in claim 3 in which successive half-read and half-write pulses on each applied to consecutive other leads, and half-read and half-write pulses are applied selectively to said row leads.

5. The arrangement claimed in claim 3 in which an output lead is provided for each row for permitting an output pulse derived from any element in a row to selectively control the application of a write control pulse to one of the first row leads.

6. A core matrix comprising a plurality of rows and a plurality of columns of cores with each row having an individual lead by way of which either half-write or half-read pulses are selectively applied, a plurality of successively pulsed leads each pulsed by a half-read pulse followed by a half-write pulse, said pulsed leads each threaded only through a respective core in one row and column and each threaded only through a respective core in another row and another column, an output lead for each core row, and means controlled responsive to an output pulse appearing on one output lead for permitting a lead individual to another row to receive a half-write pulse.

References Cited in the file of this patent

UNITED STATES PATENTS

| | | |
|---|---|---|
| 2,680,819 | Booth | June 8, 1954 |
| 2,778,006 | Guterman | Jan. 15, 1957 |
| 2,784,390 | Li Chien | Mar. 5, 1957 |
| 2,910,674 | Wittenberg | Oct. 27, 1959 |
| 2,917,754 | Ganzhorn et al. | Nov. 24, 1959 |